(12) United States Patent
Stultz et al.

(10) Patent No.: US 6,289,031 B1
(45) Date of Patent: Sep. 11, 2001

(54) INTEGRATED LIGHTWEIGHT OPTICAL BENCH AND MINIATURIZED LASER TRANSMITTER USING SAME

(75) Inventors: Robert D. Stultz, Huntington Beach; Daniel E. Maguire, Valencia; David R. Rockafellow, Los Angeles; Ashok B. Patel, Cerritos; Mario P. Palombo, Manhattan Beach, all of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/312,366

(22) Filed: May 14, 1999

(51) Int. Cl.[7] .................................................... H01B 3/08
(52) U.S. Cl. .............................................. 372/92; 372/98
(58) Field of Search .................................. 372/6, 92, 98, 372/107, 108, 29; 385/90, 10

(56) References Cited

U.S. PATENT DOCUMENTS 5,896,481 * 4/1999 Beranek et al. ...................... 385/90

* cited by examiner

*Primary Examiner*—Leon Scott, Jr.
(74) *Attorney, Agent, or Firm*—Colin M. Raufer; Leonard A. Alkov; Glenn H. Lenzen, Jr.

(57) ABSTRACT

An unproved optical bench for use in an optical system, such as a miniaturized laser transmitter, or the like. The optical bench has a housing with a plurality of V-shaped grooves formed therein. Optical elements of the optical system in which the optical bench is used are secured, such as by bonding, in the plurality of V-shaped grooves. The optical bench thus rigidly mounts the optical elements of the optical system to produce a compact and lightweight structure that is relatively insensitive to environmental extremes.

18 Claims, 2 Drawing Sheets

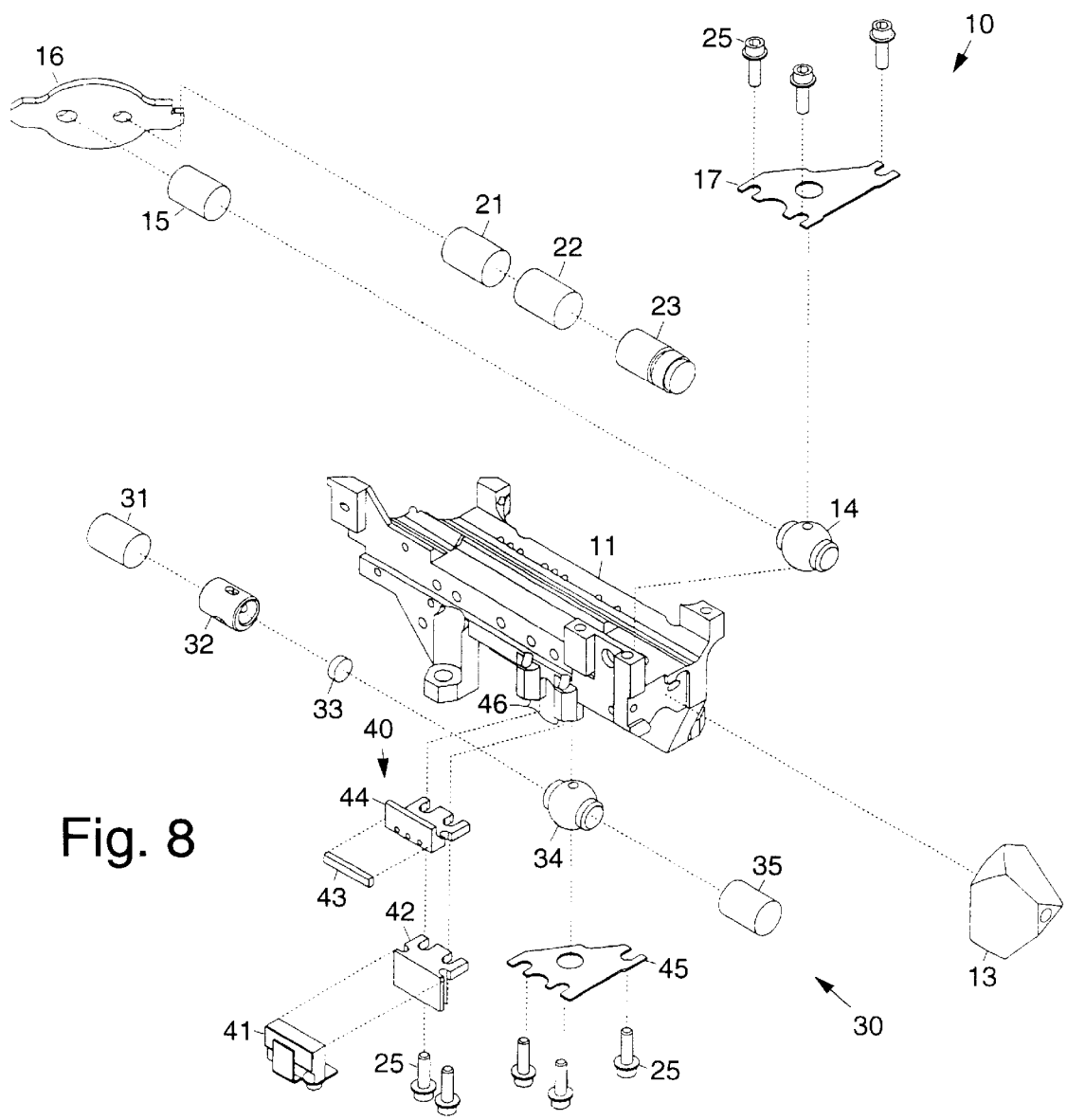

INTEGRATED LIGHTWEIGHT OPTICAL BENCH AND MINIATURIZED LASER TRANSMITTER USING SAME

BACKGROUND

The present invention relates generally to optical benches, and more particularly, to an improved optical bench for use in miniaturized laser transmitters, and other optical devices.

Previous optomechanical designs for laser resonator optical benches used in laser rangefinder systems, for example, have used a three-point mounting architecture where the optical element (resonator) was spring-loaded against three pads. This architecture proves to be heavy, bulky, and costly when used in miniaturized laser systems. In addition, the prior optical benches were not particularly rigid, and were likely to cause optical system misalignment when exposed to environmental extremes.

It therefore would be desirable to have an optical bench for use in miniaturized laser transmitters, and the like, that overcomes the limitations of conventional designs.

SUMMARY OF THE INVENTION

The present invention provides for an optical bench for use in optical systems, such as in a miniaturized laser transmitter, for example. The optical bench comprises a housing having a plurality of V-shaped grooves formed in upper and lower surfaces thereof. Optical elements of the optical system or miniaturized laser transmitter in which the optical bench is used are selectively bonded in the plurality of V-shaped grooves. What is particularly novel about the present invention is the unique manner in which the optical elements are rigidly mounted in the plurality of V-shaped grooves to produce a very compact and lightweight structure.

The optical bench of the present invention is well adapted for use in laser rangefinder systems, and the like. The optical bench is integrated with respect to the miniaturized laser transmitter in the sense that it contains a laser resonator, an aiming diode, and a beamsplitter for coupling received light to a receiver.

The present optical bench may be used to replace conventional optical benches that use three-pad kinematic mirror mounting, for example. The present invention provides a more rigid optical bench compared to previously-designed optical benches, and which is much less likely to misalign optical elements when the optical bench, or optical system in which it is employed, is exposed to environmental extremes.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 6 illustrates a right side view of the miniaturized laser transmitter and optical bench shown in FIG. 1;

FIG. 7 illustrates a cross sectional view of the miniaturized laser transmitter and optical bench shown in FIG. 1 taken along the lines 7—7 in FIG. 2; and FIG. 8 illustrates an exploded view of the miniaturized laser transmitter and optical bench shown in FIG. 1.

DETAILED DESCRIPTION

Figure 1:
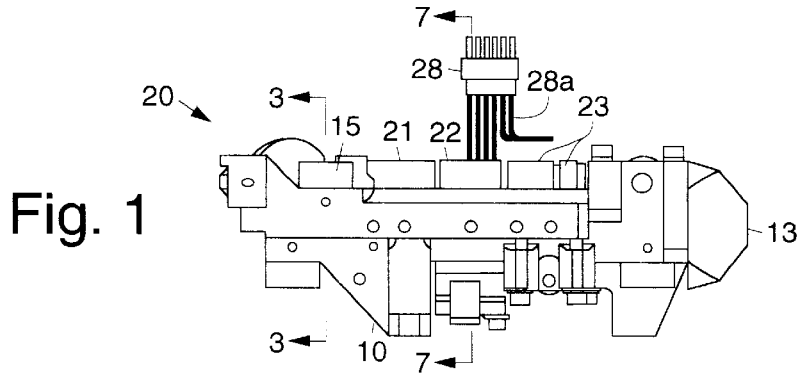
FIG. 1 illustrates a top view of a fully assembled miniaturized laser transmitter employing an exemplary optical bench in accordance with the principles of the present invention.

Referring to the drawing figures, FIG. 1 illustrates a top view of a fully assembled miniaturized laser transmitter 20 employing an exemplary optical bench 10 in accordance with the principles of the present invention. The optical bench 10 is shown as part of a miniaturized laser transmitter 20. It is to be understood, however, that the optical bench 10 may be adapted for use in optical systems other than the exemplary miniaturized laser transmitter 20.

Figure 2:
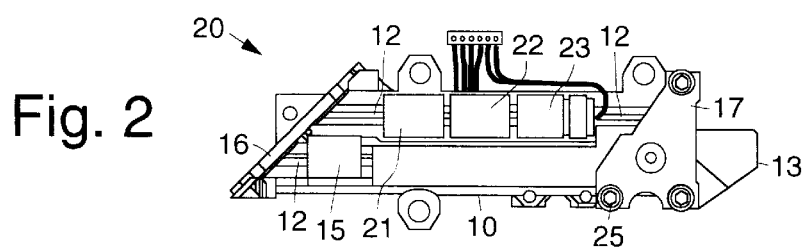
FIG. 2 illustrates a left side view of the miniaturized laser transmitter and optical bench shown in FIG. 1.
Figure 3:
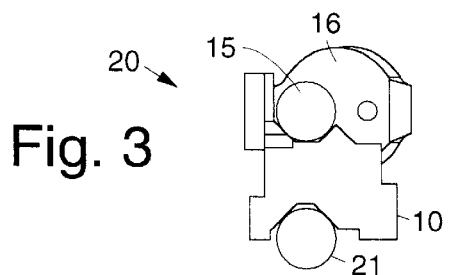
FIG. 3 illustrates a cross sectional view of the miniaturized laser transmitter and optical bench shown in FIG. 1 taken along the lines 3—3 in FIG. 2.
Figure 4:
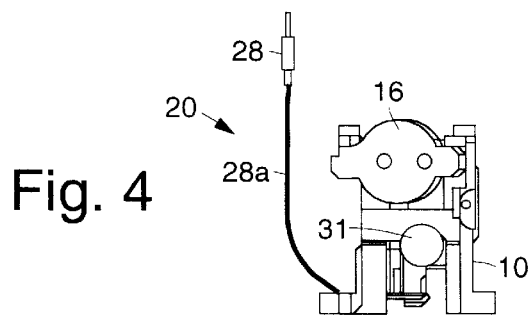
FIG. 4 illustrates a front end view of the miniaturized laser transmitter and optical bench shown in FIG. 1.
Figure 5:
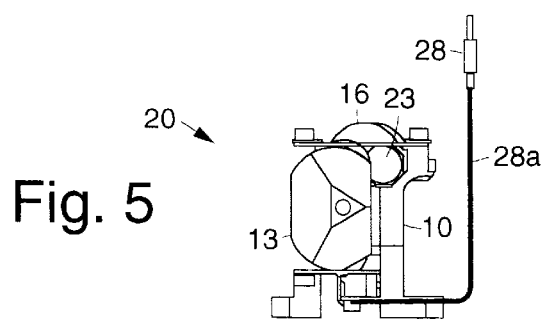
FIG. 5 illustrates a rear end view of the miniaturized laser transmitter and optical bench shown in FIG. 1.

FIGS. 2 and 6 illustrate left and right side views, respectively, of the miniaturized laser transmitter 20 and optical bench 10 shown in FIG. 1. FIG. 3 illustrates a cross sectional view of the miniaturized laser transmitter 20 and optical bench 10 shown in FIG. 1 taken along the lines 3—3 in FIG. 2. FIGS. 4 and 5 illustrate front and rear end views, respectively, of the miniaturized laser transmitter 20 and optical bench 10 shown in FIG. 1. FIG. 7 illustrates a cross sectional view of the miniaturized laser transmitter 20 and optical bench 10 shown in FIG. I taken along the lines 7—7 in FIG. 2.

FIG. 8 illustrates an exploded view of the miniaturized laser transmitter 20 and optical bench 10 shown in FIG. 1. The optical bench 10 will be described in detail with reference to FIG. 8.

The optical bench 10 comprises a housing 11 that is used to secure components used in the miniaturized laser transmitter 20. The housing 11 has a plurality of V-shaped grooves 12 formed therein and in which optical elements of the miniaturized laser transmitter 20 are disposed as will be described hereafter.

A plurality of V-shaped grooves 12 are formed in an upper surface of the housing 11 that are laterally separated from each other and are aligned with respect to a longitudinal axis of the housing 11. A V-shaped groove 12 is also formed in a lower surface of the housing 11 and is also aligned with respect to the longitudinal axis of the housing 11.

A corner cube 13 is secured to the rear end of the housing 11 using optical bonding adhesive, for example. A beamsplitter 16 is disposed at a front end of the housing 11. The beamsplitter 16 may be secured to the front end of the housing 11 using optical cement or epoxy, for example.

A plurality of alignment wedges 21, 22 and a visible light aiming diode assembly 23 are axially aligned with respect to each other and are disposed in a first V-shaped groove 12 formed in the upper surface of the housing 11. The visible light aiming diode assembly 23 outputs light at 650 μm that is coupled by way of the alignment wedges 21, 22 to the beamsplitter 16.

A collimating lens 15 is disposed in the second V-shaped groove 12 formed in the upper surface of the housing 11. A laser tilt plate assembly 14 is also disposed in the second V-shaped groove 12 formed in the upper surface of the housing 11. The laser tilt plate assembly 14 is secured in the V-shaped groove 12 using a laser tilt plate clamp 17 secured by a plurality of machine screws 25, for example to the housing 11. The collimating lens 15 is axially aligned with the laser tilt plate assembly 14. The laser tilt plate assembly 14 is angularly adjusted relative to the axis of the housing to the test target through a hole of the beamsplitter 16.

A flat mirror 31, a passive Q-switch assembly 32, 33, a laser resonator tilt plate assembly 34, and a spherical curved) mirror 35 are disposed in a V-shaped groove 12 formed in the lower surface of the housing 11. The flat mirror 31 may comprise a mirror that is 100% reflective at 1.53 $\mu$m, for example. The passive Q-switch assembly 32, 33 may comprise a calcium-fluoride (U:CaF$_2$) passive Q-switch assembly 32, 33. The spherical (curved) mirror 35 comprises a partially-reflecting outcoupler mirror 35.

A laser resonator 30 is formed by the back-reflecting flat mirror 31 (100% reflective at 1.53 $\mu$m) which forms an end reflector for the resonator 30, the passive Q-switch assembly 32, 33, a glass rod 43, a pump diode 41, the laser resonator tilt plate assembly 34 for aligning the laser resonator 30, and the curved (spherical) partially-reflecting outcoupler mirror 35.

The glass rod 43 may comprise an erbium-ytterbium (Er,Yb) glass rod 43, for example. The pump diode 41 may comprise a 940 nanometer indium-gallium-arsenide (InGaAs) pump diode 41, for example.

The laser resonator tilt plate assembly 34 is secured in the housing 11 using a laser resonator tilt plate clamp 45 secured by a plurality of machine screws 25, for example. The flat mirror 31, Q-switch assembly 32, 33, laser resonator tilt plate assembly 34 and spherical mirror 35 are axially aligned with each other. The Q-switch assembly 32, 33 comprises a Q-switch housing 32 and a Q-switch 33. The Q-switch assembly 32, 33 functions to cause a short laser pulse.

A laser diode assembly 40 is secured to the housing 11 that comprises a laser 25 diode 41, a laser diode mount 42, a laser rod 43 and a laser rod mount 44 shown in FIG. 8, along with an anode 47 and cathode 48 shown in FIG. 6. The laser diode assembly 40 is secured to a mounting surface 46 formed on the housing 11 using a plurality of machine screws 25. The laser diode assembly 40 outputs laser light at 940 nanometers. A connector 28 and wiring loom 28a are coupled to the laser diode assembly 40 and the aiming diode assembly 23, for the purpose of providing electrical inputs thereto.

The housing 11 of the optical bench 10 thus secures the laser resonator 30, the visible light aiming diode 23, and the beamsplitter 16. The laser resonator 30 includes the back-reflecting flat mirror 31, the passive Q-switch assembly 32, 33, the Er,Yb glass rod, the pump diode 41, the laser resonator tilt plate 34 for aligning the laser resonator 30, and a curved partially-reflecting outcoupler mirror 35 for coupling 1.53 $\mu$m laser light out of the laser resonator 30. The beamsplitter 16 serves to coaxially align aiming light derived from the aiming diode 23 and 1.53 $\mu$m laser light derived from the laser resonator 30. The beamsplitter 16 also serves as a reflector for a rangefinder receiver (not shown).

The optical elements are mounted in the V-shaped grooves 12 formed in the optical bench 10. The optical Cements are bonded at the bottom of channels forming the V-shaped grooves 12. Conventional optical bonding adhesive may be employed to bond the optical elements disposed in the V-shaped grooves 12. The bond is such that the optical elements are kept rigidly in contact with the V-shaped grooves 12, therefore providing constant optical alignment over temperature and environmental extremes. The optical bench 10 thus provides a very unique structure for rigidly mounting optical elements of the miniaturized laser transmitter 20 or other optical system 20 to produce a very compact and lightweight structure.

The integrated optical bench 10 may be employed in precision eyesafe rangefinders employing miniaturized laser transmitters, for example. The integrated optical bench 10 may be adapted for use in eyesafe rangefinders and other optical systems used by government and military organizations, law enforcement agencies, rifle enthusiasts, commercial mariners, sports enthusiasts, construction personnel, search and rescue personnel, firefighting personnel, skiers, yachters, golfers and municipal agencies, for example.

Thus, an integrated optical bench for use in optical systems such as miniaturized laser transmitters, and the like, has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A miniaturized laser transmitter, comprising:
   an optical bench comprising a housing having a plurality of V-shaped grooves formed therein;
   a laser resonator rigidly secured in one of the V-shaped grooves of the optical bench;
   a visible light aiming diode rigidly secured in one of the V-shaped grooves of the optical bench;
   a beamsplitter rigidly secured to an end of the optical bench and wherein the optical bench is rigidly secured to the laser resonator and the visible light aiming diode and the beamsplitter to prevent optical misalignment and provide a lightweight structure that is substantially insensitive to temperature and environmental extremes.

2. The miniaturized laser transmitter recited in claim 1 wherein the laser resonator comprises:
   a back-reflecting mirror disposed at a first end of the resonator;
   a partially-reflecting outcoupler mirror disposed at a second end of the resonator;
   a glass rod disposed between the back-reflecting mirror and the outcoupler mirror;
   a passive Q-switch disposed adjacent a first end of the glass rod;
   a laser resonator tilt plate for aligning an output beam of the laser resonator disposed adjacent a second end of the glass rod; and
   a pump diode disposed adjacent to the glass rod for coupling pump light to the glass rod.

3. The miniaturized laser transmitter recited in claim 2 wherein the back-reflecting mirror is substantially reflective at 1.53 $\mu$m.

4. The miniaturized laser transmitter recited in claim 2 wherein the passive Q-switch comprises a uranium-doped calcium-fluoride (U:CaF$_2$) passive Q-switch.

5. The miniaturized laser transmitter recited in claim 2 wherein the glass rod comprises an erbium ytterbium (Fr, Yb) glass rod.

6. The miniaturized laser transmitter recited in claim 2 wherein the pump diode comprises a 940 nanometer indium-gallium-arsenide (InGaAs) pump diode.

7. The miniaturized laser transmitter recited in claim 2 wherein the partially-reflecting outcoupler mirror comprises a curved partially-reflecting mirror.

8. The miniaturized laser transmitter recited in claim 1 wherein the beamsplitter coaxially aligns aiming light derived from the visible light aiming diode and 1.53 μm laser light derived from the laser resonator.

9. The miniaturized laser transmitter recited in claim 1 wherein optical elements are bonded to rigidly contact the V-shaped grooves to provide constant optical alignment over temperature.

10. A miniaturized laser Apparatus containing one or more optical elements, the apparatus comprising:

an optical bench comprising a housing having a plurality of laterally separated V-shaped grooves formed therein; and one or more optical elements of the optical system bonded in the plurality of laterally separated V-shaped grooves.

11. The miniaturized laser apparatus recited in claim 10 wherein the optical system comprises a miniaturized laser transmitter.

12. The miniaturized laser apparatus recited in claim 11 wherein the miniaturized laser transmitter comprises:

a laser resonator secured in a V-shaped groove of the optical bench;

a visible light aiming diode secured in a V-shaped groove of the optical bench;

a corner cube secured to a rear end of the optical bench; and a beamsplitter bonded in a front end of the optical bench.

13. The miniaturized laser apparatus recited in claim 12 wherein the laser resonator comprises:

a back-reflecting mirror disposed at a first end of the resonator;

a partially-reflecting outcoupler mirror disposed at a second end of the resonator;

a glass rod disposed between the back-reflecting mirror and the outcoupler mirror;

a passive Q-switch disposed adjacent a first end of the glass rod;

a laser resonator tilt plate for aligning an output beam of the laser resonator disposed adjacent a second end of the glass rod; and a pump diode disposed adjacent to the glass rod for coupling pump light to the glass rod.

14. The miniaturized laser apparatus recited in claim 13 wherein the back-reflecting mirror is substantially reflective at 1.53 μm.

15. The apparatus recited in claim 13 wherein the passive Q-switch comprises a uranium-doped calcium-fluoride (U:CaF$_2$) passive Q-switch.

16. The apparatus recited in claim 13 wherein the glass rod comprises an erbium-ytterbium (Er, Yb) glass rod.

17. The apparatus recited in claim 13 wherein the pump diode comprises a 940 nanometer indium-gallium-arsenide (InGaAs) pump diode.

18. The apparatus recited in claim 13 wherein the partially-reflecting outcoupler mirror comprises a curved partially-reflecting mirror.

* * * * *